C. H. LYONS.
HAY LOADER.
APPLICATION FILED MAY 20, 1912.

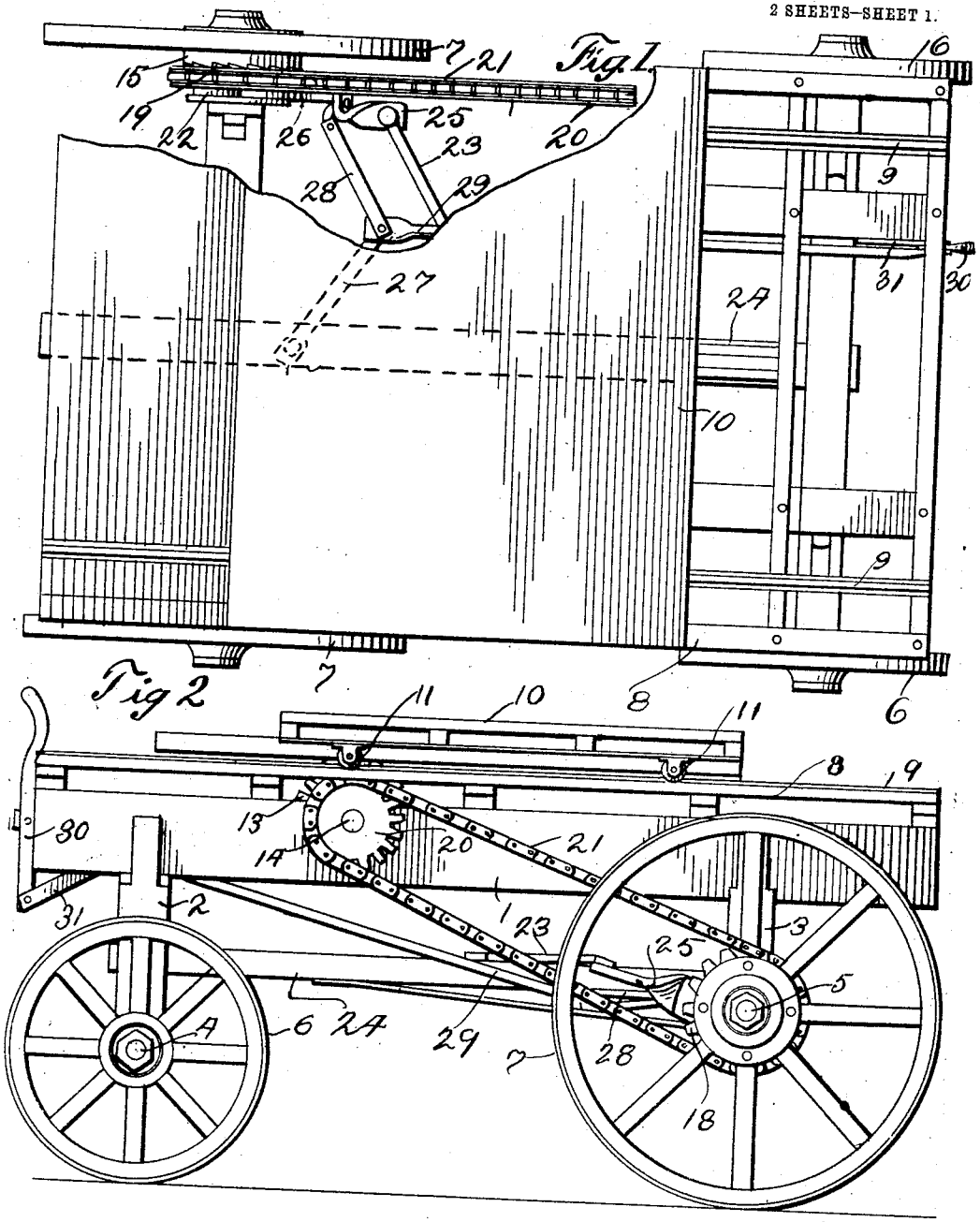

1,039,558.

Patented Sept. 24, 1912.

Witnesses

Inventor
C. H. Lyons.
By
Chas. A. Briscoe
Attorney

UNITED STATES PATENT OFFICE.

CASSIUS HOMER LYONS, OF PORTLAND, INDIANA.

HAY-LOADER.

1,039,558.  Specification of Letters Patent.  Patented Sept. 24, 1912.

Application filed May 20, 1912. Serial No. 698,531.

*To all whom it may concern:*

Be it known that I, CASSIUS H. LYONS, a citizen of the United States, residing at Portland, in the county of Jay and State of Indiana, have invented certain new and useful Improvements in Hay-Loaders, of which the following is a specification.

My invention relates to hay carriages and has for its object the provision of means by which a part of the load may be placed upon a truck movably mounted on the hay carriage and after being filled with the hay may be moved from the rear of the wagon to the front and the rear portion of the wagon afterward loaded, thus saving the loaders the necessity of carrying the hay to the front part of the wagon in loading it.

My invention furthermore, provides means by which the truck on which the first part of the load is placed may be moved from the rear end of the wagon to the front by gearing connected with one of the wheels of the wagon, and also means by which when the truck reaches its forwardmost position the gearing connecting the wheel with the truck may be thrown out of operation automatically.

My invention will be described in detail hereinafter and illustrated in the accompanying drawings, in which, Figure 1 is a top plan view of a hay carriage showing my improvements thereon, the bed of the carriage and the truck being partly broken away to disclose the operating mechanism; Fig. 2, a side view in elevation; Fig. 3, a central longitudinal sectional view; and Fig. 4, a rear view partly in section.

In the drawings similar reference characters will be used to designate corresponding parts throughout the several views.

My improved hay carriage consists of the frame 1 mounted on the bolsters 2 and 3 and having the axles 4 and 5 secured to said bolsters with the traction wheels 6 and 7 journaled thereon, the traction wheels 6 being the steering wheels of the wagon while the wheels 7 are the rear wheels thereof.

The hay carriage 8 mounted on the frame 1 is provided with tracks 9 adjacent to its side edges and mounted on said tracks is a truck 10 by means of the rollers or casters 11 that engage said tracks 9 to permit movement of the truck longitudinally of the carriage.

Secured to the under side of the truck 10 is a rack bar 12 that meshes with a pinion 13 secured to shaft 14 journaled on the frame 1. One of the rear wheels 7 has secured thereto and concentrically therewith a clutch face 15 and an inwardly extending sleeve 16.

17 indicates a sleeve slidably mounted on the sleeve 16 and having sprocket teeth 18 projecting therefrom and a clutch face 19 extending laterally from one of its edges that is adapted to engage the clutch face 15 heretofore described.

20 indicates a sprocket wheel keyed to shaft 14 and geared to the sprocket teeth 18 by means of a chain 21.

The sleeve 17 is formed with an annular groove 22.

23 indicates an arm secured to the reach rod 24 and 25 a lever pivotally secured to the terminal of said arm 23 and having a bifurcated end 26 that engages the annular groove 22.

27 indicates a lever pivotally secured to reach rod 24 and 28 a lever pivotally connected to the lever 25. Secured to the free terminals of the levers 27 and 28 is a rod 29 that extends toward the front of the frame 1 and is pivotally secured to a lever 30 fulcrumed on a support 31 mounted on said frame 1, the upper end of said lever extending above the carriage 8 to be engaged by the truck 10 when moved to the front of the hay carriage.

It will be understood from the drawings and the above description, that when the lever 30 is swung rearwardly of the hay carriage the rod 29 moves the terminals of the levers 27 and 28 secured thereto rearwardly, and said levers 27 and 28 acting as a toggle, force the lever 25 and its bifurcated end 26 toward the rear wheel 7, and in this manner locks the two clutch faces 15 and 19 in engagement, and when the wagon is moved in a forward direction, the wheel 7 acting through the clutches 15 and 19 will cause a rotation of the sleeve 17, and through said sleeve and the chain 21 geared to the sprocket wheel 20, will cause a rotation of the shaft 14 and with it the pinion 13. By the engagement of the pinion 13 with the rack bar 12, it will be understood that the rotation of the shaft 14 will cause the truck 10 to move from the rear of the wagon toward its front. In this manner, by loading the truck 10 while stationed at the rear of the wagon, after the truck has been loaded, it is moved to the front of the wagon, and when the front end of the truck reaches its forwardmost position, it will engage the upper end of the lever 30 and move it outwardly of the frame 1 and thereby cause the levers 27 and 28 connected to the rod 29 to swing toward the front of the frame and thereby swing the bifurcated end 26 of the lever 25 away from the wheel 7 and throw the clutch members 15 and 19 out of engagement so that the wagon may proceed in a forward direction without further moving the truck. In this manner it will be understood that my hay loader consists of a truck that is adapted to be loaded while at the rear of the wagon and then thrown into gear with one of the traction wheels of the wagon to move to its front end and when it has reached its forwardmost position, the gearing connecting the traction wheel of the wagon with the truck is automatically thrown out of gear and the forward movement of the truck will cease.

Having thus described my invention what I claim is:—

1. A hay loader comprising a wheeled frame, a truck movably mounted upon said frame, gearing connecting one of the wheels of the frame and said truck, and means operated by said truck to release said gearing from operation when the truck reaches the extremity of its forward movement.

2. A hay loader comprising a frame mounted on wheels, a truck movably mounted on said frame, a clutch member secured to one of said wheels, a clutch member adapted to be moved into and out of engagement with the first mentioned clutch member, gearing connecting the last mentioned clutch member with the truck aforesaid, and operating mechanism for moving said last mentioned clutch member into and out of engagement with the first mentioned clutch member, said operating mechanism being adapted to be engaged by the truck when it reaches the extremity of its forward movement to automatically release said clutch members from engagement.

3. A hay loader comprising a frame mounted on wheels, a truck movably mounted on said frame, a rack bar secured to said truck, a shaft journaled on the frame, a pinion mounted on the shaft and meshing with said rack bar, a clutch member secured to one of the wheels of the frame, another clutch member slidably mounted relatively to the first mentioned clutch member and adapted to engage therewith at times, said last mentioned clutch member being geared to the shaft aforesaid, and operating mechanism to move the last mentioned clutch member into and out of engagement with the first mentioned clutch member, said operating mechanism being adapted to be engaged by the truck when reaching the extremity of its movement in one direction and automatically release said clutch members from engagement with one another.

4. In combination with a wagon frame, axles secured to said frame, wheels journaled on said axles, and a reach rod connecting said axles, a truck movably mounted on said frame, a rack bar secured to said truck, a shaft journaled on the frame, a pinion secured to said shaft and meshing with said rack bar, a sprocket wheel secured to said shaft, a clutch member secured to one of the wheels aforesaid, a sleeve extending inwardly of said wheel, a sleeve slidably mounted on said inwardly extending sleeve and having a clutch face adapted to engage the clutch member mounted on the wheel, sprocket teeth extending radially of said sleeve, a sprocket chain connecting the sprocket wheel aforesaid and geared to the sprocket teeth on the sleeve, a lever suitably secured and loosely engaging said sleeve, a lever pivotally secured to the reach rod, another lever secured to the first mentioned lever, a rod pivotally secured to the free terminals of the last two mentioned levers, a lever pivotally secured to the front end of the wagon frame and pivotally engaging said rod, the last mentioned lever extending upwardly above the wagon frame and positioned to be engaged by the truck aforesaid when reaching the forward extremity of its movement.

In testimony whereof I affix my signature in presence of two witnesses.

CASSIUS HOMER LYONS.

Witnesses:
JOHN F. LA FOLLETTE,
CHARLIE BROSIUS.